Figure 1:
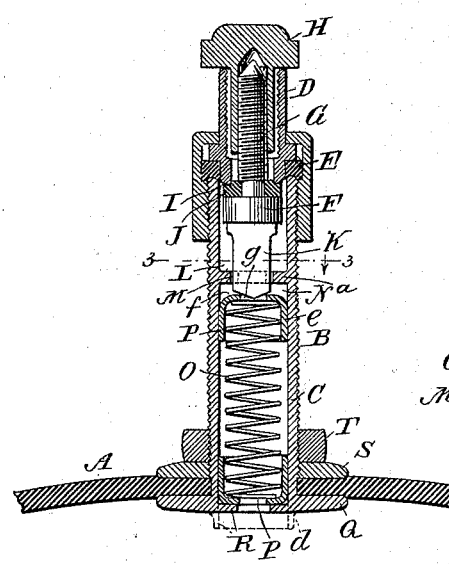

(No Model.)

G. H. F. SCHRADER.
VALVE.

No. 565,572.  Patented Aug. 11, 1896.

WITNESSES:
Fred White
Thomas J. Wallace

INVENTOR:
George H. F. Schrader,
By his Attorneys,
Arthur C. Fraser

UNITED STATES PATENT OFFICE.

GEORGE H. F. SCHRADER, OF NEW YORK, N. Y.

VALVE.

SPECIFICATION forming part of Letters Patent No. 565,572, dated August 11, 1896.

Application filed April 25, 1894. Serial No. 508,918. (No model.)

*To all whom it may concern:*

Be it known that I, GEORGE H. F. SCHRADER, a citizen of the United States, residing in the city, county, and State of New York, have invented certain new and useful Improvements in Valves, of which the following is a specification.

This invention relates most particularly to valves for pneumatic tires, and aims to improve valves of this character. Such valves are now constructed with two tubular parts coupled together, the one clamped to or vulcanized in the rubber of the tire and inclosing a movable valve proper or head, and the other containing a valve-seat engaged by this head and a nut for operating the head screwing upon the stem of the latter for drawing it toward or freeing it from the seat. To prevent rotation of the stem according to the invention disclosed in my application filed September 4, 1893, Serial No. 484,707, in which such a valve is shown, I have heretofore constructed the stem extending at both sides of the head and constructed the tubular portion with a large receiving-bore, and beyond this with a confined passage or groove, into which the corresponding end of the tail of the stem, which is made wider than its thickness, extends, and by which it is prevented from rotating. The spring in my said valve has been confined beneath the head and removable vertically therewith from the lower tubular member. This construction permits accidental loss of the spring when the piston is removed, and is subject in use to the rising of the end of the spring into the groove or its imperfect engagement with the end of the stem.

My present invention aims in valves of this character to provide the confined passage and still preserve the minimum weight of metal in the lower tube, and to provide improvements in the application of the spring to a tire-valve in such manner that its accidental removal is prevented and its operation rendered certain and accurate. To this end in the preferred embodiment of the invention I construct the lower tubular member with an enlarged bore for the head, a confined passage for the tail of the stem, and an enlarged bore beyond this passage for the spring, into which latter bore the stem passes and in which it is acted on by the spring; and also I provide a confined chamber in this large bore for the spring, and permanently fix it therein, preferably by swaging a lip formed out of the metal of the tube inwardly over the spring after its insertion, and I provide washers or cups at the end or ends of the spring for guiding and receiving the tension of the latter and transmitting it to the stem of the piston.

Figure 2:
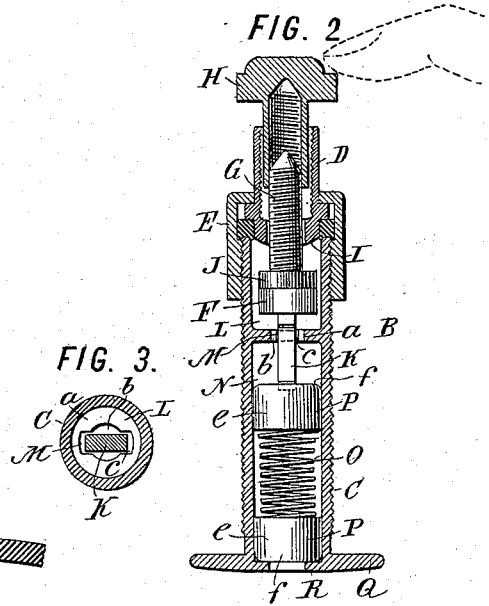
Figure 3:
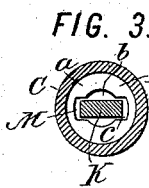
Figure 4:
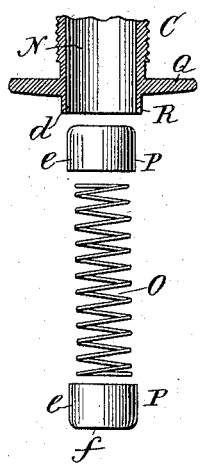
Figure 5:
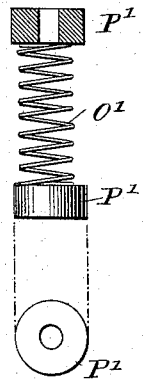
Figure 6:
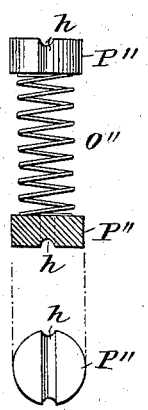

In the accompanying drawings, Figure 1 is an axial section of a tire-valve constructed according to the preferred form of my invention, the parts being shown in the closed position. Fig. 2 is a similar section looking at right angles and showing the stem and spring in elevation and in the open position. Fig. 3 is a cross-section on the line 3 3. Fig. 4 is a fragmentary elevation of the spring and its washer-cups and a fragment of the lower tube, showing the lip thereof before being swaged and before the spring is inserted. Fig. 5 is an elevation and plan view, partly in section, showing a centrally-bored cylindrical washer; and Fig. 6 is a similar view showing a peripherally-grooved solid washer.

Referring to the drawings, let A indicate a fragment of a tire; B, the valve clamped thereto; C, the inner or tire tube of the valve, which is clamped to the tire A; D, the outer or seat tube of the valve; E, a union or coupling joining these two members; F, the valve proper or head; G, the stem thereof; H, the nut engaging the stem for operating the valve; I, the valve-seat; J, the washer on the head; K, the tail end of the stem; L, the piston-bore in the tube C; M, the confined passage therein; N, the spring-bore therebelow; O, the spring therein; P, the spring washer or cup for the latter at top and bottom; Q, the shoe-flange on the tube C; R, the inturned lip at the bottom thereof; S, the shoe-washer, and T the usual knurled finger-nut screwing on the exterior of the tube C, against the washer S, to clamp the flaps of the shoe or tire A between this washer and the flange Q.

The tire A is usually a rubber tube, through which the lower end of the tube C is passed, after which the washer S and nut T are applied. The interior of the tube C, from its bore L upward, and the construction of the head and its stem, the tube D, and the coupling E are the same as that shown in my said application.

My present improvements consist in the first instance in forming the confined passage M as a narrow cross flange or projection $a$, having a central bore $b$ and one or more grooves or prolongations at its sides $c$ at the bottom of the bore L, and in constructing the remainder of the tube C with an enlarged bore N, preferably of the same diameter as the bore L. This secures great lightness, while giving the requisite engagement between the tube and stem to prevent rotation of the latter.

Another feature of improvement consists in confining the spring in the tube so that it cannot be removed from above. This is accomplished, preferably, by placing it in the large bore N below the flange $a$, which latter acts as a stop to prevent rising of the spring.

Another feature resides in permanently and irremovably securing the spring in its chamber in the tube C by constructing the latter with an inswaged lip projecting over the end of the spring and preventing its escape outwardly from that end. Preferably this lip is formed as an annular lip R, which is initially bored of the same size as the bore L and left projecting as a slender cylindrical lip $d$ (shown in dotted lines in Fig. 1 and in full lines in Fig. 4) at the outer face of the flange Q of the tube, the spring being passed into the tube through this lip, and then the latter bent or swaged inwardly till it is flush with the outer face of the flange, whereby it prevents the removal of the spring.

To properly guide the spring and insure its perfect action, I prefer to employ washers at one or both of its ends. Preferably two such washers are used in the construction of thin stamped metal cylindrical cup-washers P, having cylindrical bodies $e$ and inturned heads $f$, having rounded corners and a central perforation $g$. The portions $e$ slide on the walls of the bore N, and the heads $f$ engage, respectively, the one the end of the stem, and the other the lip R or any equivalent stop. The spring O seats within these cups and is prevented from any displacement, and its ends are prevented from escaping or from rising in the confined passage M. The perforations $g$ constitute air passages or ducts traversing the washers to permit communication therethrough.

In assembling the valve a cup is inverted, slipped into the bore N, the spring is then slid in, another cup opposed to the first is applied over the end of the spring, and then the lip R is inturned, permanently locking the spring in place. The tube C may then be clamped to the tire A. The tube D, carrying the valve or head and its stem, and the nut H will be applied or removed from the tube D by means of the coupling E. When applied, the tail K of the valve-stem passes into the passage M and slightly through the flange $a$ and downwardly into the bore N below this flange, where it engages the washer P, which transmits to it the tension of the spring O. When the nut H is released, the valve proper may be depressed against the spring to exhaust through the valve, as shown in Fig. 2, and when it is released the spring will restore it against the seat. To fill the tire, the nut H is removed, whereupon inwardly-forced air moves the head off the seat against the spring-pressure.

It will be seen that this invention provides a light, simple, and effective valve, which can be readily availed of for pneumatic tires, and it will be understood that the invention is not confined to the particular details or combination constituting its preferred form, but that it may be availed of in whole or in part, according to such modifications as circumstances or the judgment of those skilled in the art may dictate.

It is not essential that a cup-washer be employed for the spring, as, if preferred, the construction shown in Fig. 5 may be used, in which solid perforated washers P' are arranged at top and bottom of the spring lettered O'. If desired, the construction shown in Fig. 6 may be used, in which imperforate cylindrical washers P'', having peripheral ducts $h$, are employed at top and bottom of the spring lettered O''.

What I claim is—

1. In a valve, a tubular member having a valve-chamber at one end, a spring-chamber at the other end, an intermediate rigid annular flange separating said chambers, a confined passage through said flange, a valve-head in said valve-chamber, a stem for said head projecting at rear thereof into said passage and through said flange into said spring-chamber, and a spring in the latter acting on said stem, said valve-chamber and spring-chamber each open at their remote ends and there permitting entry of said valve-head and spring to them respectively, and closed at their adjacent ends by said flange against entry from one to the other of said parts, whereby either of said parts can be removed without freeing the other.

2. In a valve, a tubular member having a valve-chamber at one end, a spring-chamber at the other end, an intermediate rigid annular flange separating said chambers, and a confined passage through said flange of greater length than breadth, a valve-head in said valve-chamber, a stem for said head, of greater width than thickness, and projecting through said passage into said spring-chamber, and a spring in the latter acting on said stem, said valve-chamber and spring-chamber each open at their remote ends and thereby permitting entry of said valve-head and spring to them respectively, and closed at their adjacent ends by said flange against entry from one to the other of said parts, whereby either of said parts can be removed without freeing the other.

3. In a valve, a tubular member C having an inswaged rigid lip R, a head F, a stem therefor projecting at both sides thereof, a spring O acting against said stem, and confined within said member, and a washer within said member between said spring and lip whereby said spring and washer are irremovably fastened in said member.

4. In a valve, a tubular member having two chambers and an intermediate rigid internal flange, and a confined passage past the latter, in combination with a valve-head in one of said chambers, a valve-seat opposite said head, a stem for the latter projecting through said passage past said flange and within the second chamber of said member, a spring O in said second chamber below said stem, and a washer in said second chamber between said spring and stem and transmitting the motion of the one to the other, said washer of greater size than said passage and prevented by said lip from escaping from said second chamber, said valve-chamber and spring-chamber each open at their remote ends and there permitting entry of said valve-head and spring to them respectively, and closed at their adjacent ends by said flange against entry from one to the other of said parts, whereby either of said parts can be removed without freeing the other.

5. In a valve, a tubular member, a valve-head therein, and a valve-seat opposite said head, in combination with a spring in said tubular member, and a substantially cylindrical washer, traversed by a duct within said member between said spring and head, substantially as described.

6. In a valve, a tubular member, a valve-head therein, and a valve-seat opposite said head, in combination with a spring in said tubular member, and a cup-shaped washer therein having a hollow side passing around the outside of and enveloping the end of said spring and transmitting the tension thereof to said head.

7. In a valve, a tubular member C, a valve-head therein, a stem projecting at both sides of the latter, and a valve-seat opposite said head, said tubular member having an integral flange $a$ subdividing its interior, large chambers at each side thereof, and a confined passage through said flange, said stem projecting through and held non-rotatively in said passage in said flange, and into both said chambers and a spring in the chamber below said flange, of greater size than said passage, engaging the projecting end of said stem and operating the latter and prevented by said flange from entering the other chamber, said valve-chamber and spring-chamber each open at their remote ends and thereby permitting entry of said valve-head and spring to them respectively, and closed at their adjacent ends by said flange against entry from one to the other of said parts, whereby either of said parts can be removed without freeing the other.

In witness whereof I have hereunto signed my name in the presence of two subscribing witnesses.

GEORGE H. F. SCHRADER.

Witnesses:
GEORGE H. FRASER,
THOMAS F. WALLACE.